(12) United States Patent
Li

(10) Patent No.: US 11,073,711 B2
(45) Date of Patent: Jul. 27, 2021

(54) LCD DEVICE AND MANUFACTURING METHOD THEREOF

(71) Applicant: HUIZHOU CHINA STAR OPTOELECTRONICS TECHNOLOGY CO., LTD., Huizhou Guangdong (CN)

(72) Inventor: Quan Li, Huizhou Guangdong (CN)

(73) Assignee: HUIZHOU CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 448 days.

(21) Appl. No.: 16/079,156

(22) PCT Filed: May 10, 2018

(86) PCT No.: PCT/CN2018/086364
§ 371 (c)(1),
(2) Date: Aug. 23, 2018

(87) PCT Pub. No.: WO2019/178924
PCT Pub. Date: Sep. 26, 2019

(65) Prior Publication Data
US 2021/0080774 A1 Mar. 18, 2021

(30) Foreign Application Priority Data
Mar. 23, 2018 (CN) .......... 201810247272.X

(51) Int. Cl.
*G02F 1/1333* (2006.01)
*G02F 1/1335* (2006.01)

(52) U.S. Cl.
CPC .. *G02F 1/133351* (2013.01); *G02F 1/133512* (2013.01); *G02F 1/133516* (2013.01); *G02F 2202/28* (2013.01)

(58) Field of Classification Search
None
See application file for complete search history.

(56) References Cited

U.S. PATENT DOCUMENTS

2004/0212774 A1* 10/2004 Yamazaki ......... G02F 1/133351
349/187
2011/0164212 A1* 7/2011 Yeh ...................... G02F 1/1339
349/106
(Continued)

FOREIGN PATENT DOCUMENTS

| CN | 103197445 | 7/2013 |
| CN | 103278952 A | 9/2013 |

(Continued)

*Primary Examiner* — Shan Liu
(74) *Attorney, Agent, or Firm* — Leong C. Lei

(57) ABSTRACT

The present invention teaches a LCD device and a related manufacturing method. The LCD device includes a LCD panel and a shielding plate. The LCD panel includes an array substrate and a color filter substrate. The array substrate includes a display section attaching to the color filter substrate, and a bonding section extending from the display section and reaching beyond the color filter substrate. The shielding plate includes a first section above the color filter substrate, and a second section extending from the first section and corresponding to the bonding section. Encapsulation adhesive is filled between the second section and the bonding section. With shielding plate along a LCD panel's periphery to cover black edges of the LCD device, the LCD panel is guaranteed to have smooth edges and no additional bezel is required to hide the FPC board, fulfilling the bezel-less design.

3 Claims, 2 Drawing Sheets

(56) References Cited

U.S. PATENT DOCUMENTS

| | | | | |
|---|---|---|---|---|
| 2014/0055735 A1* | 2/2014 | Oono | ................. | G02F 1/13394 |
| | | | | 349/153 |
| 2017/0205659 A1* | 7/2017 | Chien | ............... | G02F 1/133528 |
| 2018/0101036 A1* | 4/2018 | Wang | ................ | G02F 1/133512 |
| 2018/0180930 A1* | 6/2018 | Cho | .................. | G02F 1/133528 |
| 2019/0196265 A1* | 6/2019 | Fujihara | .............. | G06F 3/04164 |

FOREIGN PATENT DOCUMENTS

| CN | 103823319 | 5/2014 |
|---|---|---|
| CN | 104965331 | 10/2015 |
| CN | 105652491 | 6/2016 |
| CN | 106292034 | 1/2017 |
| CN | 106547140 A | 3/2017 |
| KR | 20130131692 A | 12/2013 |

* cited by examiner

LCD DEVICE AND MANUFACTURING METHOD THEREOF

RELATED APPLICATIONS

The present application is a National Phase of International Application Number PCT/CN2018/086364, filed May 10, 2018, and claims the priority of China Application No. 201810247272.X, filed Mar. 23, 2018.

FIELD OF THE INVENTION

The present invention is generally related to the field of display technology, and more particularly to a liquid crystal display (LCD) device and a related manufacturing method.

BACKGROUND OF THE INVENTION

Bezel-less liquid crystal display (LCD) device is a popular product trend. A bezel-less display device is one whose screen has extremely narrow bezels, and the screen and the bezels are merged to create a visual appearance of no physical bezels. A major advantage of bezel-less display devices is their visual and fashionable appeal. Another major advantage is that they may be used to construct superior tiled display systems involving two, three, or more display devices. In addition, bezel-less display devices may provide viewers with broader viewing experience without the sense of constraint of wide-bezel display devices.

Current display devices usually have flexible printed circuit (FPC) board installed along the bezel. Even though the FPC board may be bended behind the display device, the FPC board may still be visible, compromising the appearance of the display device. Therefore wider bezel is required so as to hide the FPC board, thereby violating the bezel-less design.

SUMMARY OF THE INVENTION

The technical problem to be resolved by the present invention is overcome the shortcomings of the prior art by providing a LCD device having superior shielding effect and facilitating bezel-less design, and a related manufacturing method that is simple, lower-cost, and has enhanced encapsulation efficiency.

To achieve the above objectives, the present invention adopts the following technical solutions.

The LCD device, includes a LCD panel comprising an array substrate and a color filter substrate, where the array substrate comprises a display section attaching to the color filter substrate and a bonding section extending from the display section and reaching beyond the color filter substrate; and a shielding plate comprising a first section above the color filter substrate and a second section extending from the first section and corresponding to the bonding section, where encapsulation adhesive is filled between the second section and the bonding section.

Selectively, the second section extends beyond the bonding section, and encapsulation adhesive is above the region of the second section that goes beyond the bonding section.

Selectively, the LCD panel further includes a flexible printed circuit (FPC) board extending along a back side of the array substrate facing away from the color filter substrate and whose two ends are bended around outer edge of the bonding section and attached to a front side of the bonding section. The two ends of the FPC board point towards each other, and the encapsulation adhesive is extended from above the second section beyond the bonding section towards the ends of the FPC board that are bonded to the bonding section.

Selectively, the LCD panel further includes a first polarization plate and a second polarization plate. The first polarization plate is disposed on the color filter substrate to a lateral side of the first section, and the second polarization plate is disposed on the array substrate.

Selectively, encapsulation adhesive is filled between the color filter substrate and the first section, and a front side of the first polarization plate facing away from the color filter substrate is level with a front side of the shielding plate facing away from the color filter substrate.

Selectively, the shielding plate has a thickness between 0.10 and 0.30 mm.

Selectively, the shielding plate includes a reinforced glass plate and a shielding layer, and the shielding layer is disposed on a back side of the reinforced glass plate facing towards the array substrate.

The present invention also teaches a manufacturing method for a LCD device, including:

disposing a shielding plate between two LCD panels as described above, where the shielding plate has two first sections at two ends above the color filter substrates of the LCD panels, respectively, and the shielding plate also has a second section between the two first sections;

disposing an elongated blocking plate on the second section, and forming spaces between the blocking plate and the LCD panels;

filling the spaces with encapsulation adhesive;

curing to the encapsulation adhesive; and cutting along lateral sides of the encapsulation adhesive where the encapsulation adhesive interfaces with the blocking plate.

Selectively, the encapsulation adhesive is cured by applying ultraviolet light to the encapsulation adhesive.

Selectively, the manufacturing method further includes the step of grinding the shielding plate's free ends.

The advantages of the present invention are as follows. Shielding plate is provided along a LCD panel's periphery to cover black edges of the LCD device. The shielding plate is fixed to the LCD panel by encapsulation adhesive. With the shielding process, the LCD panel is guaranteed to have smooth edges and no additional bezel is required to hide the FPC board. In addition, the manufacturing method is simple, lower-cost, more efficient, and may be applied to multiple LCD panels simultaneously.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

The following descriptions for the respective embodiments are specific embodiments capable of being implemented for illustrations of the present invention with referring to appended figures.

Embodiment 1

Figure 1:
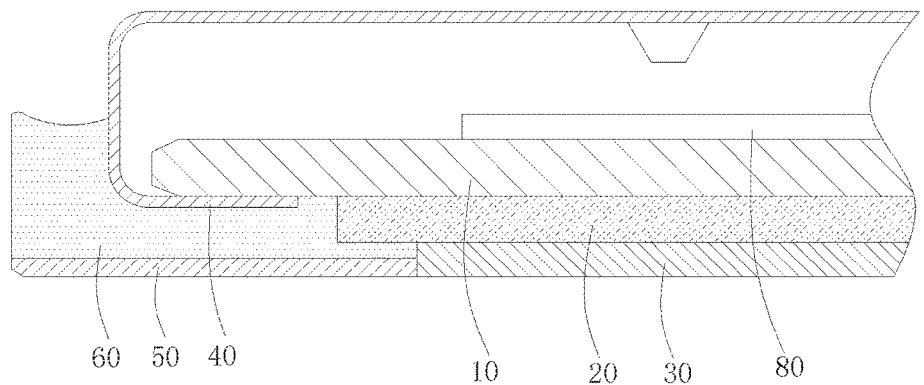
FIG. 1 is a schematic diagram showing a LCD device according to an embodiment of the present invention.

As shown in FIG. 1, a LCD device according to an embodiment of the present invention includes a LCD panel and a shielding plate 50. The LCD panel includes an array substrate and a color filter substrate 20. The array substrate 10 includes a display section attaching to the color filter substrate 20, and a bonding section extending from the display section and reaching beyond the color filter substrate 20. The shielding plate 50 includes a first section above the color filter substrate 20, and a second section extending from the first section and corresponding to the bonding section. Encapsulation adhesive 60 is filled between the second section and the bonding section. Through the encapsulation adhesive 60, the shielding plate 50 is affixed to the LCD panel, guaranteeing an integral appearance of the LCD panel without adding additional bezel to hide the peripheral region of the LCD panel, thereby achieving the bezel-less design.

Furthermore, the second section extends beyond the bonding section. The region of the second section that goes beyond the bonding section also has encapsulation adhesive 60 so as to achieve complete shield to the bonding section.

Specifically, the LCD panel also include a liquid crystal layer (not shown), a first polarization plate 30 attached to the color filter substrate 20, and a second polarization plate 80 attached to the array substrate 10. The first polarization plate 30 is disposed to a lateral side of the first section.

Furthermore, the LCD panel also includes a FPC board 40 extending along a back side of the array substrate 10 facing away from the color filter substrate 20 and whose two ends are bended around outer edge of the bonding section and attached to a front side of the bonding section. The two ends of the FPC board 40 point towards each other. The encapsulation adhesive 60 is extended from above the second section beyond the bonding section towards the ends of the FPC board 40 that are bonded to the bonding section.

Selectively, a front side of the first polarization plate 30 facing away from the array substrate 10 is level with a front side of the shielding plate 30 facing away from the substrate 10. As such, the LCD panel is guaranteed to have a flat surface and therefore more appealing. Preferably, the shielding plate 30 includes a reinforced glass plate and a shielding layer on a back side of the reinforced glass plate facing towards the array substrate 10. The shielding layer is preferably made of a black opaque material and formed on the reinforced glass plate through an ink printing or sputtering process. A front side of the reinforced glass plate facing away from the array substrate 10 is level with the front side of the shielding plate 30 facing away from the substrate 10. As the reinforced glass plate has superior flatness and the LCD panel has superior flatness after shielding process is applied to the peripheral region of the display panel. The LCD device therefore provides enhanced visual experience. The shielding layer may adopt material of a different color in alternative embodiments.

Preferably, the color filter substrate 20 extends laterally beyond the first polarization plate 30 and the shielding plate 50 has a smaller thickness than that of the first polarization plate 30. As such, where the shielding plate 50 and the first polarization plate 30 are joined laterally side-by-side, a gap is formed between the shielding plate 50 and the part of the color filter substrate 20 beyond the first polarization plate 30. The gap is filled with the encapsulation adhesive 60. Through the encapsulation adhesive 60's adhesion, a portion of the shielding plate 50 is fixedly joined to the color filter substrate 20. In this way, the shielding plate 50 is further affixed to the LCD panel, ensuring the shielding plate 50's stability.

Furthermore, the shielding plate 50 of the present embodiment has a thickness between 0.10 and 0.30 mm.

Preferably, the ends of the FPC board 40 adjacent to the bonding section are covered by the encapsulation adhesive 60. The ends of the FPC board 40 are therefore reliably fixed to the bonding section. The FPC board 40 is prevented from being broken due to repeated bending, and the circuit elements are prevented from being damaged. The FPC board 40 is therefore under a specific level of protection. The shielding plate 50, the color filter substrate 20, the array substrate 10, and the FPC board 40 are tightly joined together by the encapsulation adhesive 60. The internal structure of the shielding portion of the LCD panel is therefore more robust after the LCD panel undergoes shielding process.

Embodiment 2

FIGS. 2A to 2D show a LCD device undergoes the steps of a manufacturing method according to an embodiment of the present invention. These steps are as follows.

Figure 2A:
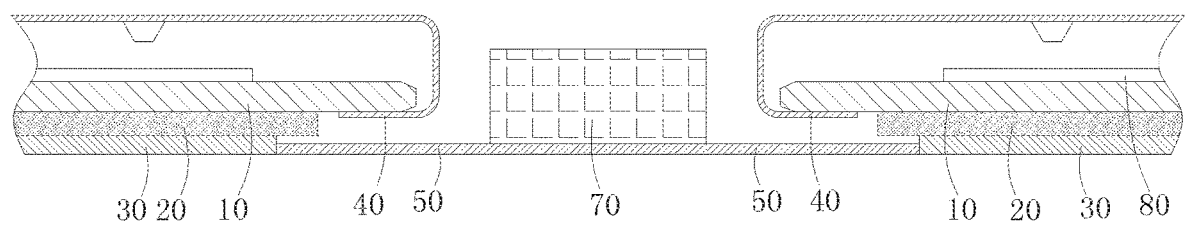
FIGS. 2A to 2D show a LCD device undergoes the steps of a manufacturing method according to an embodiment of the present invention.

Step S1, as shown in FIG. 2A, a shielding plate 50 is disposed between two LCD panels described in embodiment 1 where the shielding plate 50 has two first sections at two ends above the color filter substrates 20 of the LCD panels, respectively. The shielding plate 50 also a second section between the two first sections.

Step S2, as shown in FIG. 2A, an elongated blocking plate 70 is disposed on the second section, where spaces are formed between the blocking plate 70 and the LCD panels.

Figure 2B:
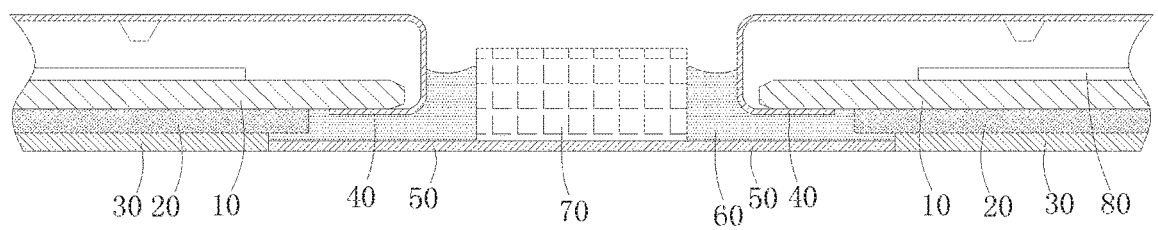

Step S3, as shown in FIG. 2B, the spaces are filled with encapsulation adhesive 60.

Specifically, adhesive dispenser is applied to inject encapsulation adhesive 60 into the spaces to the two sides of the blocking plate 70. Each space is surrounded by the blocking plate 70, the shielding plate 50, the color filter substrate 20, and the array substrate 10.

Step S4 conducts curing to the encapsulation adhesive 60.

Figure 2C:
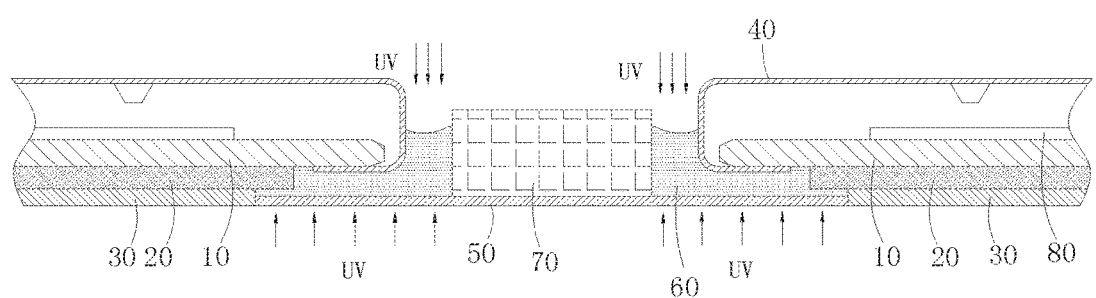

Specifically, as shown in FIG. 2C, the encapsulation adhesive 60 is cured by applying ultraviolet (UV) light from above and below the shielding plate 50 until the encapsulation adhesive 60 is completely cured. After the encapsulation adhesive 60 is cured, the blocking plate 70 is removed.

Step S5 performs cutting along the lateral sides of the encapsulation adhesive 60 where the encapsulation adhesive 60 interfaces with the blocking plate 70 before the blocking plate 70 is removed.

Figure 2D:
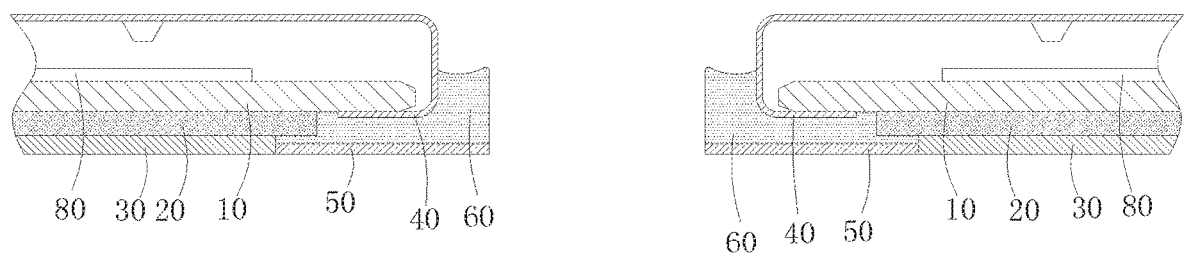

Specifically, as shown in FIG. 2D, after cutting, the free ends of the shielding plate 50 that are away from the first polarization plate 30 are level with the lateral sides of the encapsulation adhesive 60 where the encapsulation adhesive 60 interfaces with the blocking plate 70. There is no surplus encapsulation adhesive 60 that would extend beyond the periphery of the LCD panel. After cutting, the free ends of the shielding plate 50 are ground to form slant surface so that the LCD device has smoother edge without causing incision to a user.

The present invention teaches a LCD device and a related manufacturing method, where shielding plate is provided along a LCD panel's periphery to cover black edges of the LCD device. The shielding plate is fixed to the LCD panel by encapsulation adhesive. With the shielding process, the LCD panel is guaranteed to have smooth edges and no additional bezel is required to hide the FPC board, fulfilling the bezel-less design. In addition, the manufacturing method is simple, lower-cost, more efficient, and may be applied to multiple LCD panels simultaneously.

Above are embodiments of the present invention, which does not limit the scope of the present invention. Any equivalent amendments within the spirit and principles of the embodiment described above should be covered by the protected scope of the invention.

What is claimed is:

1. A manufacturing method for a LCD device, comprising:

disposing a shielding plate between two LCD panels, where each LCD panel comprises a color filter substrate; the shielding plate has two first sections at two ends above the color filter substrates of the LCD panels, respectively, and the shielding plate also has a second section between the two first sections;

disposing an elongated blocking plate on the second section, and forming spaces between the blocking plate and the LCD panels;

filling the spaces with encapsulation adhesive;

curing to the encapsulation adhesive; and cutting along lateral sides of the encapsulation adhesive where the encapsulation adhesive interfaces with the blocking plate.

2. The method according to claim 1, wherein the encapsulation adhesive is cured by applying ultraviolet light to the encapsulation adhesive.

3. The method according to claim 1, further comprising the step:

grinding the shielding plate's free ends.

* * * * *